United States Patent [19]

Miller

[11] 4,147,531

[45] Apr. 3, 1979

[54] METHOD AND APPARATUS FOR REMOVING SURFACE CONTAMINANTS FROM METALLIC SCRAP

[75] Inventor: Ronald E. Miller, Murrysville, Pa.

[73] Assignee: Aluminum Company of America, Pittsburgh, Pa.

[21] Appl. No.: 819,602

[22] Filed: Jul. 27, 1977

[51] Int. Cl.$^2$ .............................................. C21B 1/00
[52] U.S. Cl. ..................................... 75/44 S; 75/68 R
[58] Field of Search .................. 75/63, 65, 44 S, 68 R

[56] References Cited

U.S. PATENT DOCUMENTS

| | | | |
|---|---|---|---|
| 3,558,304 | 1/1971 | McIntyre | 75/63 |
| 3,839,016 | 10/1974 | Rawlings | 75/44 S |
| 3,869,112 | 3/1975 | Habayeb | 75/44 S |
| 3,955,970 | 5/1976 | Claxton | 75/65 R |
| 3,997,336 | 12/1976 | van Linden | 75/68 R |

Primary Examiner—P. D. Rosenberg
Attorney, Agent, or Firm—William J. O'Rourke, Jr.; Robert T. Teeter

[57] ABSTRACT

A method is provided for substantially completely removing volatilizable and combustible impurities from the surface of metallic scrap comprising the steps of continuously depositing surface contaminated scrap onto the surface of a stream of molten metal, directly propelling the floating scrap along the molten surface for a time sufficient for the heat from the molten metal to effectuate substantially complete removal of the contaminants from the scrap and forcibly submerging the remaining decontaminated scrap into the molten metal stream. A system is also provided for removing impurities from the surface of scrap comprising a trough of molten metal, means for moving the molten metal through the trough, means for continuously depositing contaminated scrap onto the molten metal surface, means for propelling the floating scrap through the trough and means for forcibly submerging the remaining floating scrap into the molten metal after the contaminants are substantially completely removed.

7 Claims, 4 Drawing Figures

METHOD AND APPARATUS FOR REMOVING SURFACE CONTAMINANTS FROM METALLIC SCRAP

BACKGROUND OF THE INVENTION

1. Field of Invention

The present invention relates to the melting of scrap metal and more particularly to the controlled removal of coatings, such as lacquers, including epoxies, vinyls and acrylics, as well as oils, grease and other volatilizable and combustible surface contaminants on scrap metal as a prelude to, or in association with melting, but without adversely affecting the melting operation itself.

2. Description of the Prior Art

It is well known that coatings, such as lacquers, and other surface contaminants on aluminum can scrap and the like should be removed prior to melting in order to avoid unacceptable melt loss. One preliminary cleaning process typically employs an organic solvent such as acetone which removes a substantial portion of the lacquer, oils and other surface contaminants. The most common preliminary cleaning approach, however, is the delacquering furnace in which the material is continuously conveyed through controlled zones of increasing temperature, progressively heating the material to about 1000° F. which volatilizes the impurities to effect their removal. After the scrap is held in the furnace for sufficient dwell time, the scrap eventually exits the furnace with very little remaining lacquer residue. For aluminum can scrap, the current delacquering process significantly adds to the cost of a pound of recycled aluminum. Additionally, the delacquering furnaces are a continual maintenance problem resulting in excessive downtime and costly delays for necessary repair. For example, if the temperature in the delacquering furnace exceeds about 1050° F., the surface contaminants may ignite and cause a harmful fire to spread throughout the furnace. Thus, careful control is often needed to prevent these problems which, in turn, adds to the cost of recycling aluminum.

The prior art of melting scrap, also teaches that charged scrap metal must be submerged or immersed rapidly into a bath of molten metal to avoid oxidation and to minimize skim formation on the melt. In the method of the present invention, however, the charged scrap metal is deposited on a molten metal surface where it remains unsubmerged for controlled delacquering and deoiling to occur, without experiencing the adverse effects caused by oxidation of the scrap. Such adverse effects are avoided in the present invention because the substantial source of heat in the area where the scrap is deposited on the molten surface is from the molten metal.

Accordingly, an economical and effective method of removing coatings and contaminants from metallic scrap is required. Such method should be readily adaptable to be practiced in place in the existing remelt furnaces and preferably eliminate the need for separate delacquering facilities.

SUMMARY OF THE INVENTION

This invention may be summarized as providing a method for melting contaminated scrap comprising the steps of continuously depositing surface contaminated scrap on the surface of a moving stream of molten metal, directly propelling the floating scrap along the molten surface for a time sufficient for the heat from the molten metal to effectuate substantially complete removal of the contaminants from the scrap and forcibly submerging the remaining decontaminated scrap into the molten metal stream. This invention also provides a system for melting contaminated scrap comprising a trough of molten metal, means for moving the molten metal through the trough, means for continuously depositing contaminated scrap onto the molten metal surface, means for propelling the floating scrap through the trough and means for forcibly submerging the remaining floating scrap into the molten metal after the contaminants are substantially completely removed.

Among the advantages of the subject invention is the elimination of the need for an independent preliminary cleaning process for scrap such as the conventional delacquering furnace.

It follows that an objective of the present invention is the reduction in the cost to produce secondary or remelt metal.

Another objective of the present invention is to provide a method and system for delacquering scrap in-place in an unconfined side bay trough of a continuous melting furnace in which the substantial source of heat is from the molten metal flowing therethrough, without increasing the amount of melt loss experienced in conventional melting practice employing separate delacquering facilities.

Another advantage of this invention is the utilization of the heat from the circulating metal in present continuous melting furnace facilities for effectuating substantially complete removal of coatings and other surface contaminants from scrap metal.

These and other objects and advantages of this invention will be more fully understood and appreciated with reference to the following detailed description and the drawings appended hereto.

DESCRIPTION OF THE PREFERRED EMBODIMENTS

Figure 1:
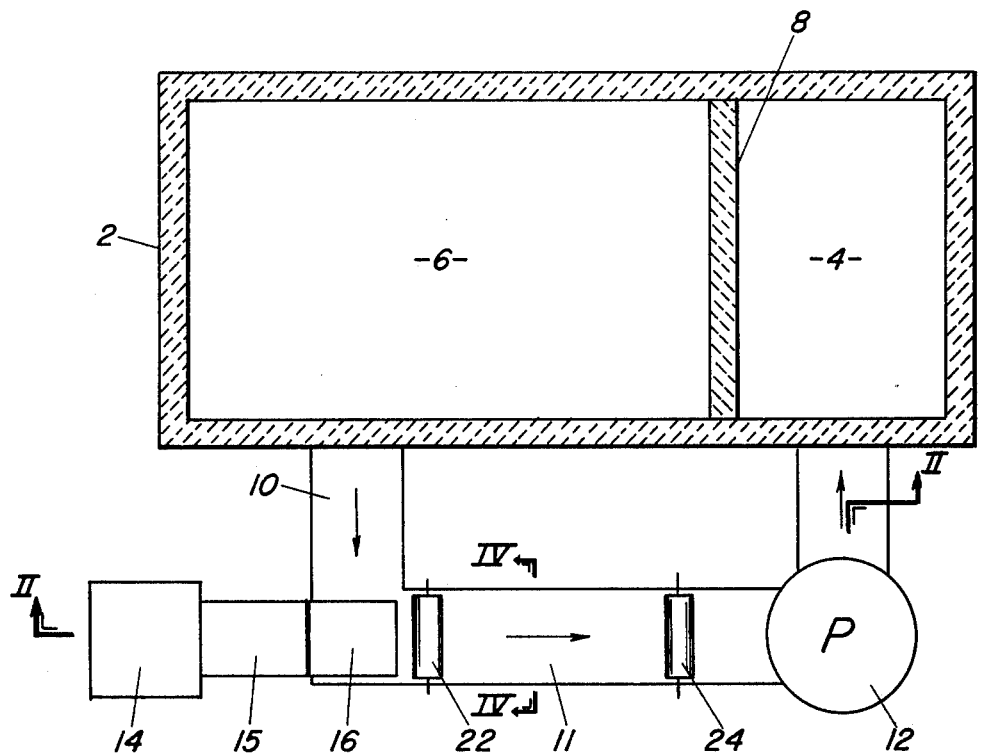
FIG. 1 is a top elevation view of a furnace arrangement suitable for practicing the present invention.

Referring particularly to the drawing, FIG. 1 illustrates a dual chamber recirculating melting system or furnace 2 suitable for practicing the present invention. This arrangement includes a skim collection chamber 4 and a heating chamber 6 separated by a dividing wall 8. The chambers 4 and 6 are in fluid communication in order that molten metal may freely flow through the furnace from the skim collection chamber 4 to the heating chamber 6.

The furnace shown in FIG. 1 also includes a side bay trough 10 through which molten metal may be circulated. It is a straight section 11 of this side bay trough 10 or the like in which the method of the present invention is preferably practiced. The dual chamber furnace arrangement 2 is merely illustrative of the type of facility in which the present invention may be employed. However, any arrangement which lends itself to the circulation of molten metal in a trough or the like may be employed in practicing the present invention.

A pump 12 is provided in the side bay trough 10 to supply the driving force to continuously circulate molten metal through the furnace system and maintain a moving stream of molten metal through the trough 10. When melting aluminum scrap in accordance with the present invention, the preferred pumping system utilizes either an axial flow pump, such as that disclosed in United States Van Linden et al U.S. Pat. No. 3,997,336, or a centrifugal discharge pump. The pump is immersed in the molten metal and is positioned inside a cylindrical well of an open-ended volute. It should be understood that other methods of moving the stream of molten metal may be employed including sloping the trough and relying on the force of gravity to move the molten metal. In a preferred embodiment of this invention, the pump not only maintains the circulation rate for the molten metal, but also creates a controlled molten metal vortex into which the scrap flows and is forcibly submerged after the surface contaminants have been substantially completely removed. In the context of the present invention, surface contaminants are "removed" from scrap metal by volatilization and/or combustion, with such combustion occurring either at the surface of the scrap or above the surface of the scrap after volatilization. The vortex draws the scrap into the pump well, thereby forcibly submerging or ingesting the remaining unmelted, substantially contaminant free scrap.

Figure 2:
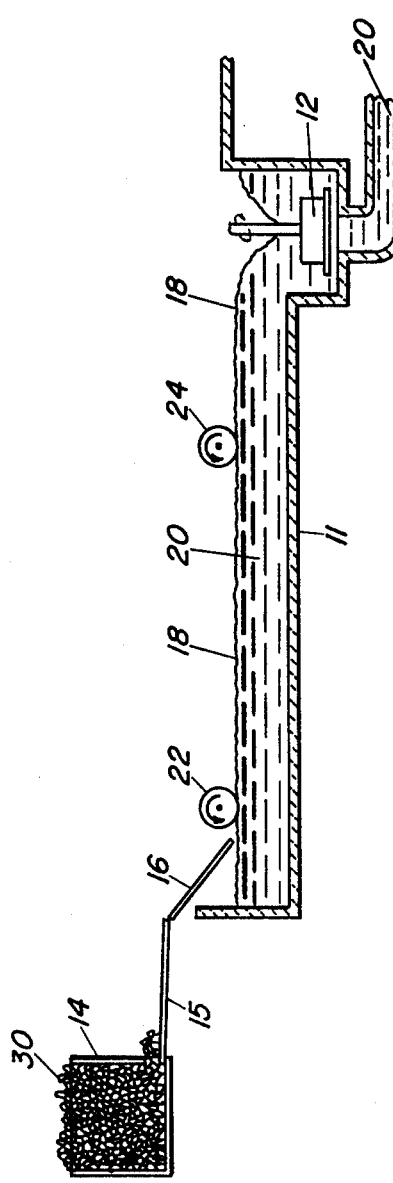
FIG. 2 is a side elevation view through II—II of the side bay trough shown in FIG. 1.

Also illustrated in the melting system 2 shown in FIG. 1 is an overhead hopper 14, a vibrating conveyor 15 and a chute 16. The hopper 14 may be used to hold a large quantity of scrap which is to be delacquered and/or deoiled and then melted by the method of the present invention. As shown in FIG. 2, the overhead hopper 14 feeds the vibrating conveyor 15 which, in turn, discharges the scrap onto the chute 16. The chute 16 leading from the vibrating conveyor 15 extends downwardly to a point at or near the surface 18 of the molten metal 20 in the trough 10. Preferably the chute is disposed at an angle or slope low enough to prevent excessive submergence of the scrap falling therefrom onto the molten metal surface 18. Also, it is the vibration rate of the conveyor 15 which controls the rate and therefore the amount of scrap continuously deposited onto the molten metal surface 18 which determines the thickness of the body of scrap floating thereon. As explained in more detail below, the thickness of the body of scrap deposited on the surface 18 of the molten metal 20 should be such that the combustible contaminants on the scrap are substantially completely burned or vaporized prior to their reaching the location of the downstream pump 12.

A variety of types of contaminated scraps may be used in the present invention including skeletal scrap, lacquered can scrap, oily chips and turnings and borings. Since each of these scraps may have different density, size and weight as well as different amounts of combustible contaminants thereon, it may be helpful to provide a variable vibration control for the conveyor 15, and perhaps a height and angle adjustable chute 16 in order to be able to adjust for and minimize surface turbulence and submergence as the different types of scrap are fed onto the molten metal surface 18.

Figure 3:
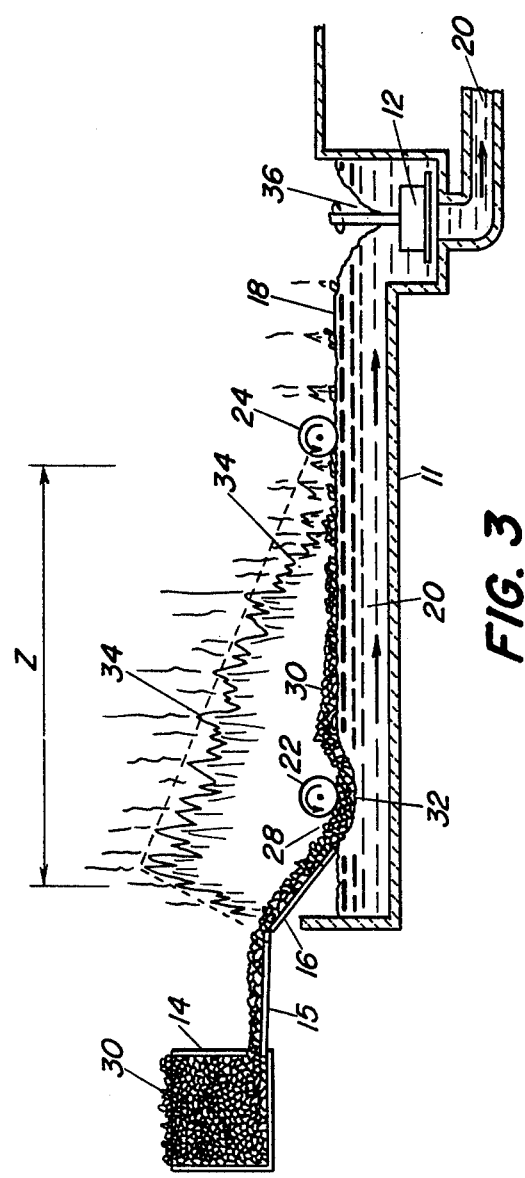
FIG. 3 is a side elevation view of the side bay trough shown in FIG. 2 with surface contaminated scrap deposited on the surface of molten metal moving therethrough.

The method of the present invention is practiced in a delacquering and/or deoiling zone Z, shown in FIG. 3, preferably in a straight section 11 of an open trough 10. It will be understood that the present invention may also be utilized in curved, tapered, sloped or enclosed troughs and may even be practiced on the surface of a circulating stream of molten metal, such as exists in the vortex of a pumping bay. However, it should be understood that the application of heat external to the heat in the molten metal does not have to be provided in the zone to practice the method of the present invention. External heat sources such as direct fired oil or gas burners could cause incipient melting of the scrap, causing excessive oxidation and resulting in unacceptable melt loss. The substantial source of heat for removing surface contaminants from the scrap passing through the delacquering zone is from the molten metal flowing therethrough. The vibrating conveyor 15 and the chute 16, as shown in the drawing of the preferred system, feed contaminated scrap in substantially the same direction as that of molten metal flow through the delacquering and deoiling zone. Preferably, the chute is sloped at an angle of about 45° and extends to a point slightly, such as less than six inches, above the surface 18 of molten metal 20 moving in the trough 10.

Downstream of the end of the chute 16 is a rotatable cylinder 22, also referred to herein as a feed gate igniter, which directs the scrap fed onto the surface 18 of the molten metal 20 therethrough, holds the scrap close enough to the molten metal to ignite the combustibles on the scrap and then directly propels the scrap at a controlled rate along the molten metal stream independent of the flow rate of the molten stream. It is the feed gate igniter 22 which controls the rate at which the floating contaminated scrap moves along the metal stream regardless of the rate at which the metal stream is circulating by means of direct propulsion applied to the scrap passing thereunder. A preferred feed gate igniter 22 for the present invention is a rotatable refractory cylinder extending substantially completely across the width of the straight trough section 11 and having its axis disposed perpendicularly to the direction of metal flow. The cylinder 22 is located downstream of the discharge end of the chute 16 and is preferably disposed adjacent the chute 16 such that scrap exiting the chute 16 is deposited on the molten metal surface 18 under the outer peripheral surface of the cylinder 22. This arrangement lends itself to efficient control of the rate at which the scrap is propelled along the molten metal surface 18 by the pinching action of the cylinder 22 against the deposited scrap fed from the chute 16 to force the scrap into intimate contact with the molten metal surface 18. This cylindrical gate 22 is disposed toward the molten metal surface 18 such that the molten metal surface 18 does not touch, but is substantially tangent to, the outer peripheral surface of the cylinder. The cylinder 22 may be able to be raised in instances where the scrap feed rate is increased. The cylinder 22 is rotated about its axis, and in the view illustrated in FIGS. 2 and 3, rotation of the cylinder in the counterclockwise direction directs the floating scrap toward the downstream pump 12 at a controlled rate, independent of the flow rate of the molten metal stream.

Figure 4:
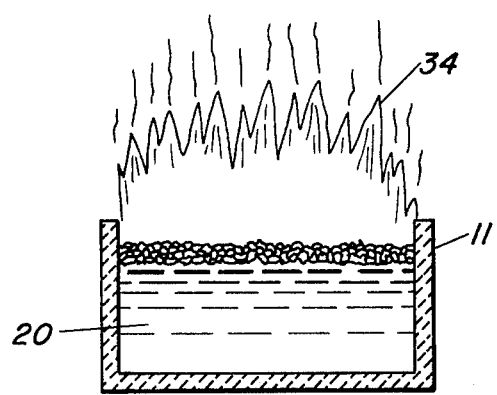
FIG. 4 is a cross-sectional view through IV—IV of the side bay trough shown in FIG. 1 with surface contaminated scrap deposited on the surface of molten metal therein.

A discharge or exit gate 24 may be located downstream from the feed gate igniter 22. The exit gate 24 may also be a rotatable refractory cylinder. The rotation rate of the feed gate igniter 22 is not necessarily synchronized with the rotation rate of the discharge gate 24 because melting of the floating scrap occurring as the scrap floats from one gate to the other causes the volume of the scrap to continuously diminish. Usually, any cross section of the mass of floating scrap, as shown in FIG. 4, is retained on the molten metal surface in the delacquering zone for a mean residence time of from about thirty seconds to about two minutes, during which time at least approximately 30% of the scrap by weight may be melted. The residence time for the floating scrap not only depends upon the type of scrap being charged and the amount and type of contaminants thereon, but the residence time is also proportional to the scrap charging rate. If more scrap is being charged, the mass of floating scrap is thicker. Thicker masses of scrap require more time to be decontaminated because the source of heat in the delacquering zone is from the circulating molten metal passing under the mass of scrap. The delacquering zone Z shown in FIG. 3 is the length of trough in which contaminants are being combusted, as defined by the flame therein having a decreasing height as the scrap proceeds in the downstream direction. The presence of the discharge gate 24 is primarily to provide a means for stopping any scrap in which the combustible contaminants have not yet fully volatilized, from prematurely passing into the pump 12 where subsurface volatilization of uncombusted contaminants may adversely affect melt loss and skim formation.

The gates 22 and 24 may, at times, come into contact with the molten metal. When aluminum is being melted, the molten aluminum is preferably held at a temperature of approximately 1300° to 1400° F. The gates, especially the feed gate igniter 22, are subjected to very high temperatures upon combustion of the contaminants on the scrap passing thereunder. Therefore, it is preferable that the gates 22 and 24 are constructed of a durable, heat resistant material. To this end, stainless steel is an acceptable material but is often considered too costly. It has been found that a refractory material is acceptable for constructing the gates. Also, although the preferred configuration for the feed gate igniter 22 is cylindrical, a paddle wheel type arrangement may also be suitable.

The cylinders 22 and 24 could be rotated by a variety of known methods including motorized or hand-operated cranks, or by a series of gears. It should be noted that the particular mechanism used to turn such gates should also be heat resistant or otherwise protected from the area around the gate where adverse conditions, ambient heat and hydrocarbon emissions may hamper operations.

In the operation of the melting system described above, molten aluminum 20 is circulated from a skim collection chamber 4 to a heating chamber 6, through a side bay trough 10 and back to the skim collection chamber 4. The circulation of the molten metal 20 may be maintained and, simultaneously, a suitable vortex may be created by the operation of a centrifugal discharge pump. In a preferred arrangement, as illustrated in FIGS. 1 and 3, running a centrifugal discharge pump at approximately 100 rpm or operating an axial flow pump at about 200 rpm should be able to circulate molten metal at the rate of approximately 250,000 pounds per hour. The velocity of the molten metal 20 flowing through the straight trough section 11 should be fast enough to prevent the system from freezing in order that the molten metal maintains a temperature adequate to effect the removal of surface contaminants from the scrap metal. Preferably such velocity is between about two and two and one-half feet per second.

In the method of the present invention, a quantity of contaminated metallic scrap is continuously deposited onto the moving stream of molten metal, as shown in FIG. 3. Exemplary scraps include crushed beverage containers, skeletal scraps, turnings and borings, oily chips and compacted metallic briquettes. These scraps may contain lacquer coatings and rubber or plastic end seals or inserts in a container seam, along with certain grease and oil deposits and other surface contamination, all of which must be substantially removed prior to submerging the scrap metal in order to minimize melt loss and skim formation. The amount and type of surface contamination on the scrap may vary considerably depending upon the type of scrap being melted. Thus, the time required to volatilize and combust the contaminants can change with each type of scrap, and may vary considerably with each batch of the same type of scrap. It is preferred, therefore, to continuously charge the same type of scrap, at least for a period of time, in order to stabilize the melting operation as much as possible.

The overhead hopper 14 should be filled with sufficient scrap to maintain a constant scrap feed rate. Depending upon the size of the hopper 14, it may be necessary to fill the hopper 14 during feeding of the scrap in order to sustain a certain charging and melting increment. The scrap may be fed from the hopper 14 across a vibrating conveyor 15 and into a chute 16, or the like, by any known method. The scrap exits the chute 16 and falls onto the surface 18 of molten metal 20 just upstream of the feed gate igniter 22. The sides of the metal trough and the gate serve as limits on the charging area 28 for the scrap. These dimensional limits, in conjunction with the scrap feed rate, determine the thickness of the cluster of scrap which is fed through and is directly propelled by the feed gate igniter 22. The height of the feed gate igniter 22 from the molten surface 18 may also be adjustable to control the thickness of the scrap cluster. The thickness of the cluster of scrap should be such that ample oxygen from the ambient air is supplied to the combustible contaminants located in the lower regions of the cluster of scrap. If the raft of scrap is too thick, the combustibles in the lower regions of the scrap cluster are not able to be burned because of the lack of oxygen. It has been found that a cluster thickness of less than about six inches does not adversely affect burning of contaminants in bottom regions of the floating scrap.

In the preferred arrangement, shown in FIG. 3, the rotatable refractory cylinder 22, disposed just above the surface 18 of molten metal 20, is utilized as the feed gate igniter 22. Rotation of the cylinder causes the scrap 30 in the charging area 28 to be grasped and pushed downwardly under the cylinder but importantly not under the surface of molten metal 24. The floating cluster of scrap which is forced under the rotating cylinder 22 for only a short period of time does not overcome the surface pressure of the molten metal. Rather, the unconfined surface of molten metal recedes under the cylinder and rises equivalently in other areas of the trough. If the contaminated scrap is prematurely submerged into a molten aluminum bath, oxides and volatiles are released into the molten metal, trapping a certain amount of aluminum with the oxides as they rise to the surface. Such action adversely affects the melting operation by increasing the amount of metal loss and should, therefore, be avoided. If excessive premature scrap submergence is experienced in the operation of the present invention, the scrap feed rate should be reduced and/or the rotating cylinder 22 should be slightly raised above the molten metal surface 18 to insure efficient operation.

By the above-described arrangement, the floating cluster of scrap, although not submerged into the moving stream of molten metal 20, is disposed at a lower level than the upstream surface of molten metal 20 at the location where the scrap passes under the feed gate igniter 22. This slight depression creates enough of a pressure head behind the depressed scrap to propel all of the scrap clustered together downstream of the point of depression 32. The majority of the forward, or downstream, motion is maintained by the pinching and pushing action of the feed gate igniter 22 against the scrap. The surface of the many pieces of scrap which lie in or against the molten metal surface 18 are continuously delacquered, deoiled and at least partially melted as the scrap moves downstream. The scrap melting, along with the heat released by the combustion of the surface contaminants, causes the scrap to agglomerate, forming a cluster of scrap which can be viewed as acting something like a raft. Accretion of the continuously fed scrap 30 to the rearward, or upstream, end of the scrap raft ensures that the cluster of scrap is generally continuous in the lateral directions, i.e. without substantial voids, until the particular increment of scrap charging is complete. Minor pauses in charging of scrap are tolerable and in such instances, the discharge gate 24 may be utilized to stop the downstream cluster or clusters of scrap from floating until the voids or spaces between clusters, caused by the pause in charging, are filled by incoming scrap.

There are expected to be major pauses between charging of different types of scrap and in instances when the charging of cold scrap has reduced the temperature of the circulating molten metal below that desirable. In this latter instance, charging must be discontinued until the desired metal temperature has been recovered. In the apparatus shown in the drawing, metal temperature could be recovered in about 5 or 10 minutes as the molten metal passes through the fired heating chamber 6. Although the melting temperature for aluminum is about 1220° F., it will be understood that the temperature recovery necessary for optimum melting conditions for molten aluminum is between 1250° and 1700° F. and preferably between 1300° and 1400° F. However, for delacquering purposes alone, much lower temperatures of about 1000° F. would be adequate. To the extent that the present method of removing contaminants from scrap is employed in conjunction with the melting operation, the melting temperature limitations must be followed. However, it is considered possible to delacquer alone by the method and in the system of the present invention by depositing contaminated scrap onto at least a 1000° F. surface of molten salts.

The scrap aluminum 30 fed from the chute 16 hits the molten metal surface 18 having a temperature of approximately 1300° to 1400° F. which is more than adequate to ignite the combustible contaminants. The majority of the contaminants is burned within the first few seconds, and minor amounts of remaining contaminants are burned as the scrap floats downstream toward the pump 12 or other submerging device. A graph of contaminants burned over the period of time that the floating scrap is propelled through a delacquering zone in a trough would parallel the flame height along the straight trough section, as shown by the dotted line in FIG. 3, which can be observed upon charging of the scrap into the straight section of trough. Even if the thickness of the cluster of charged scrap is held constant, the burning pattern for different types of scraps and for scraps having different quantities of combustibles thereon varies. The surface contaminants on some scraps ignite, and the burning flame height will diminish uniformly, as is the case with crushed lacquered can scrap. Other scraps ignite and the burning flame height remains high for a period of time before diminishing, as is the case with oily chips. Still other scraps ignite and the burning flame height diminishes relatively rapidly, as is the case with dried crushed skeletal scrap. The flame height, therefore, serves as a definite indicator of when the combustible contaminants have been substantially completely vaporized.

The preferred time for forcibly submerging the remaining decontaminated floating scrap 30 is within twenty seconds after the flame is extinguished, i.e. after the surface contaminants are substantially completely volatilized and/or combusted. The time at which the flame is extinguished can easily be determined from a quick trial in the system described above. It will be found, however, that certain major fluctuations in amounts of contaminants may occur in each scrap charge increment. When such occurs, a higher than normal flame will be observed in the downstream areas of the trough 11. The discharge gate 24 is utilized in such instances to stop the flow of scrap for a longer than normal time, until the flame has nearly extinguished, indicating that the higher quantity of contaminants has been substantially burned and volatilized.

In FIG. 3, the height of the flame 34 correlates with the amount of contaminants being burned at any location in the straight trough section 11. Notice that the flame 34 is nearly extinguished as the floating scrap reaches the discharge gate 24. There may be minor, insignificant amounts of unburned contaminants which emit a flame even as the scrap 30 is drawn into the vortex 36 created by the pump 12 and is forcibly submerged as is typically the case even with scrap which has been pretreated in a delacquering furnace.

It should also be understood that the cluster of scrap 30 floating on the surface 18 of molten metal 20 provides a covering over an otherwise exposed trough 11. In fact, the ignition of the contaminants on the surfaces of the scrap helps minimize the heat loss from the circulating molten metal otherwise caused by the cooler ambient atmosphere.

In a preferred embodiment, a cover or hood may be provided above the trough to trap the emissions released as the combustible contaminants are burned from the scrap. Such a hood could prevent release of the hydrocarbons into the atmosphere. These gases could then be transported to a heating chamber, or the like, where they could be further combusted.

Two examples for practicing the method for removing combustible contaminants from metallic scrap in accordance with the present invention are as follows:

EXAMPLE 1

Molten aluminum having a temperature of approximately 1400° F. is circulated in an apparatus substantially similar to that shown in the drawing. A centrifugal discharge pump 12 is operated at about 100 rpm to circulate molten aluminum at a rate of approximately 250,000 pounds per hour. The molten aluminum maintains a steady and uniform flow through a straight trough section 11 at a rate of approximately 2.3 feet per second. The straight section 11 is one and one-half feet in width and about eighteen feet in length measured from discharge point of the chute 16 to the entrance of the pump 12. The delacquering zone distance between the feed gate igniter 22 and the discharge gate 24 is about sixteen feet. In this example, crushed beverage cans are constantly charged into the charging area 28 at a rate of about 75 to 100 pounds per minute, for about eight minutes. The feed gate is controlled to directly propel the floating scrap 30 along the molten aluminum surface such that any individual piece of scrap is retained on the surface of the metal in the delacquering zone for a mean residence time of about one minute. During scrap flotation, approximately 40% of the scrap, by weight, is melted by the undercurrent of molten aluminum.

At a location about two to four feet downstream of the discharge gate 24 is the vortex created by the operation of the pump 12. The remaining unmelted floating scrap is directed into the vortex and is thereby forcibly submerged into the molten aluminum within twenty seconds after the combustibles are substantially completely removed from the surfaces of the scrap.

For comparison purposes, can scrap which had already been treated in a delacquering furnace was charged into the same trough. There is no significant difference between the amount of skim accumulated in the skim collection chamber 4 when charging either the delacquered crushed containers or the lacquered crushed containers. These results indicate that the controlled flotation removes comparable combustibles and yields results much the same as those previously obtained using separate delacquering facilities.

EXAMPLE 2

The same apparatus and circulation rates were used as described above for Example 1. In this example, oily aluminum chips were charged into the charging area 28 at a rate of approximately 100 pounds per minute for about 10 minutes. The individual chips required a mean residence time of about one and one-half minutes on the metal surface for deoiling to be substantially completed prior to forcibly submerging the chips in the pump area.

Again for comparison purposes, predried chips, i.e. chips which had the oil previously removed therefrom in a delacquering furnace, were charged into the same trough. Again, there was no significant difference between the amount of skim accumulated in the skim collection chamber 4 when charging either oily chips or predried chips. Virtually all of the combustible contaminants in the scrap are removed prior to submerging the scrap by the present invention, which is comparable to the results obtained when utilizing the prior delacquering system.

Although the present invention has been discussed as pertaining primarily to scrap which is relatively small in size, the present invention could be utilized to delacquer and deoil relatively large scrap, such as briquettes.

Whereas the particular embodiments of this invention have been described above for purposes of illustration, it will be apparent to those skilled in the art that numerous variations of the details may be made without departing from the invention. For example, instead of employing a straight trough section for delacquering and deoiling the scrap, the scrap may be charged directly into a circular pump bay wherein under controlled conditions the scrap is propelled circumferentially on the surface of the molten metel in the vortex where the combustible contaminants are removed immediately before submergence of the decontaminated scrap.

I claim:
1. A method for melting surface contaminated metallic scrap comprising, in sequence, the steps of:
    continuously depositing surface contaminated scrap onto the surface of molten metal;
    moving the floating scrap along the molten surface for a time sufficient for the heat from the molten metal to effectuate substantially complete removal of the contaminants from the scrap; and
    forcibly submerging any unmelted, decontaminated scrap into the molten metal after the contaminants are substantially completely removed.
2. A method for removing combustible contaminants from aluminum scrap comprising, in sequence, the steps of:
    continuously depositing surface contaminated aluminum scrap on a 1250° to 1700° F. surface of a moving stream of molten aluminum;
    moving the floating contaminated scrap along the molten aluminum surface by direct propulsion of said scrap independently of the rate of the moving molten aluminum for a time sufficient for the heat from the molten metal to effectuate substantially complete removal of the surface contaminants from the scrap; and
    forcibly submerging the unmelted, decontaminated scrap into the stream of molten aluminum after the contaminants are substantially completely removed.
3. A method according to claim 2 wherein the molten aluminum surface temperature is from 1300° to 1400° F.
4. A method according to claim 2 wherein the remaining floating scrap is forcibly submerged approximately twenty seconds after the contaminants are substantially completely removed.
5. A method according to claim 2 wherein the molten aluminum stream is moving at a rate of about two to two and one-half feet per second.
6. A method according to claim 2 wherein the scrap deposited on the molten aluminum stream is retained thereon for a mean residence time of from about thirty seconds to about two minutes prior to submerging the unmelted scrap.
7. A method for removing volatilizable impurities from the surface of aluminum scrap comprising, in sequence, the steps of:
    moving a stream of molten aluminum maintained at a temperature of from 1300° to 1400° F. through a trough of an aluminum recirculating furnace at a rate of approximately from two to two and one-half feet per second;
    continuously depositing aluminum scrap, surface contaminated with volatilizable impurities, onto the molten metal surface at an upstream portion of the stream with respect to the direction of metal flow;
    directly propelling the floating contaminated scrap along the molten aluminum surface independently of the flow rate of the molten stream, in the direction of meal flow, for a period of from about thirty seconds to about two minutes, until the heat from the molten stream effectuates volatilization of the impurities from the scrap, during which time at least 30% of the floating scrap, by weight, being melted; and
    forcibly submerging the remaining floating scrap into a molten metal vortex created in a downstream portion of the stream with respect to the direction of metal flow within twenty seconds after the impurities are substantially completely volatilized.

* * * * *